Jan. 19, 1937.  G. M. KRIEGBAUM  2,068,382
SEED PLANTER
Filed Dec. 29, 1934

Inventor
George M. Kriegbaum
By V. F. Lassague
Atty.

Patented Jan. 19, 1937

2,068,382

UNITED STATES PATENT OFFICE 2,068,382

SEED PLANTER

George M. Kriegbaum, Richmond, Ind., assignor to International Harvester Company, a corporation of New Jersey Application December 29, 1934, Serial No. 759,681

7 Claims. (Cl. 221—125)

This invention relates to seed dispensing mechanism for planters and particularly to the type of machine in which seeds are discharged singly from a seed plate driven from the carrying wheels of the planter through suitable intermediate mechanism.

The object of my invention is to improve, simplify, and make more effective the operation of selecting, separating, and delivering a predetermined number of kernels to the planting devices of a planter, which kernels should be accumulated singly and deposited collectively in hills when the planter is being operated by check-row mechanism, or which may be both accumulated and deposited singly when drilling.

A further and more specific object of the invention is to provide a valve or gate located in the hopper bottom adjacent the seed plate at the opening opposite the cut-off.

A further object of the invention is to provide a pivoted gate of such design as to maintain, by reason of its own weight and the weight of seed over it, contact with the seed plate, thereby preventing seeds from rolling under the cut-off and knock-out pawl case at this point thereby interfering with the operation of the knock-out pawl.

A further object of the invention is to allow any surplus seeds, which may have passed the cut-off and failed of discharge through the cell in the seed plate, to readily pass into the hopper.

A further object is to prevent seeds, such as peas, for instance, from being split, especially in side hill planting as the hoppers are tilted to one side allowing the seeds to roll under the cut-off and knock-out pawl case.

A further object of the invention is to provide a construction for seeding devices which, while particularly applicable for use in connection with an edge-drop seeding plate may be also used in connection with flat seed plates which employ a series of round openings removed from the edge of the plate.

Figure 1:
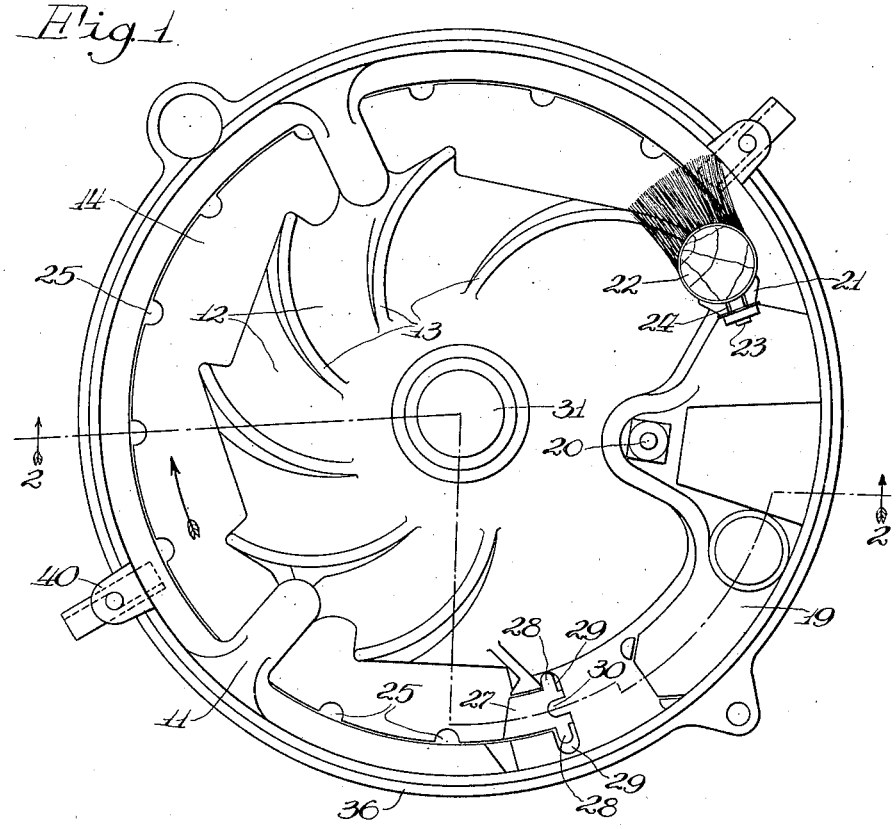
Figure 2:
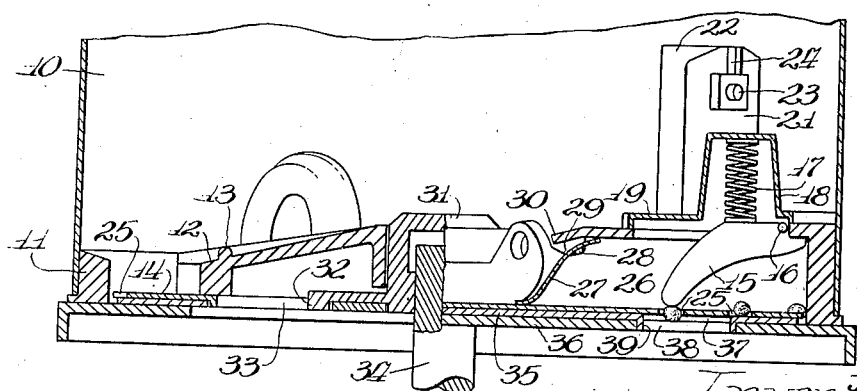

Other objects and advantages will appear in the following description of a preferred embodiment of the invention, as illustrated in the accompanying drawing, wherein:

Figure 1 is a plan view of the bottom of the seed hopper showing the novel cut-off; and, Figure 2 is a vertical view of the seed hopper partly in section along line 2—2 of Figure 1, showing the cut-off.

In the construction illustrated, the seed hopper 10 is secured to the pea hopper bottom 11. The pea hopper bottom 11 is formed with distributing grooves 12 which are formed by the upstanding ridges 13. The hopper bottom 11 is also formed with a surface in the nature of a cone so as to aid the seed in being distributed to the seed plate 14, as best shown in Figure 2.

An inner knock-out pawl or member 15 forming knock-out means is pivoted to the hopper bottom 11 by means of the pin 16 integral with the pawl and pivoted in grooves in the hopper bottom, not shown. The lower end of the pawl 15 is so formed to permit the seed plate 14 to travel in the direction of the arrow marked on the seed plate 14, but not in the reverse direction. The end of the pawl also provides a knock-out to aid in discharging the seed through the seed plate, as shown. A compression spring 17 is attached to the pawl 15, as shown, and held in place by the spring recess 18 in the pawl cap 19, which is secured to the pea hopper bottom 11 by the bolt and nut 20.

Attached to the pawl cap 19 is a bracket 21 to which the brush cut-off 22 is adjustably attached by means of the bolt 23 through the cut-off and the slot 24 in the bracket. The brush cut-off is used to allow only the required number of seeds, which have found their way into seed cells 25 in the seed plate 14, to enter the pawl knock-out chamber 26 where the seeds are discharged to the seed boot, not shown. Although a brush cut-off 22 has been disclosed, it is to be understood that this may take any other form, such as a metal cut-off.

At the discharge end of the pawl knock-out chamber 26, a hinged cut-off 27 is pivoted to the hopper bottom 11, as best shown in Figure 1. The cut-off 27 is preferably formed of sheet metal having at its upper end outwardly extending lugs 28, which act as pintles and are pivoted in recesses 29 formed in the hopper bottom. The lower end of the gate or cut-off 27 is shaped with an upwardly curved end to contact the seed plate 14. The cut-off is held in place by the force of gravity and the weight of the superimposed seed. The cut-off is limited in its upward movement by the stop 30 integral with the hopper bottom 11. The cut-off prevents excess seed from collecting in the knock-out chamber and preventing the knock-out from functioning properly. At the same time, it also allows any seed which may have passed the forward cut-off to pass through.

The seed plate 14 is driven by a driving disk 31 which is journaled in the hopper bottom 11. The driving disk 31 has lugs 32 which fit in corresponding slots 33 in the seed plate 14. The driving disk 31 is driven from a driving shaft 34 operated by mechanism driven from the planter wheels, not shown, because it is unnecessary for the understanding of the invention. A filler ring 35 is placed between the seed drop plate 14 and the hopper bottom plate 36. The filler ring 35 has a seed drop opening 37 through which the seeds drop and this seed drop opening 37 is aligned with a similar seed drop opening 38 in the hopper bottom plate. The openings 37 and 38 are kept in alignment by the lugs 39 on the filler ring 35. The hopper bottom plate 36 is securely fastened to the hopper bottom 11 by clamps pivoted to the ears 40 on the hopper bottom 11.

The operation of the invention, which has been described as attached to a pea hopper, is very simple. Seed is placed in the hopper, and the planter to which the hopper is attached is put into gear, which in turn operates the hopper mechanism through the shaft 34, which in turn drives the driving disk 31, which is connected to the seed plate 14. The seed plate 14 revolves in the direction of the arrow, and the seed cells 25 are filled with seed. Excess seed is normally prevented from entering the knock-out chamber 26 by means of the brush cut-off 22. As the seed passes the openings 37 and 38, and comes underneath the knock-out pawl 15, the pawl aids in the discharge of the seed. The hinged cut-off 27 allows any excess seed to pass out of the knock-out chamber and at the same time prevents any seed from entering at this end because of the gravity operated cut-off.

In all, a very simple mechanism has been invented whereby the seed is prevented from clogging the knock-out chamber, and also prevented from being split. A further advantage is gained in that, in operating on side hills, the knock-out chamber is prevented from becoming clogged.

It will be evident from the above disclosure that a simple mechanism has been provided which will maintain a proper relation between the driving mechanism, the seed plate and the knock-out pawl, the knock-out chamber with a brush or metal cut-off at the entrance, and the cut-off at the discharge end of the knock-out chamber.

The construction herein described exemplifies the preferred form of the invention, and it will be obvious to those skilled in the art that various modifications may be made within the scope of the following claims.

What is claimed is:

1. In a seed planter, a hopper, a seed plate revolubly supported in said hopper, said plate having a series of seed cells, a stationary member located above the plate having a knock-out chamber therein normally closed at both ends and a cut-off mounted thereon in advance of said knock-out chamber permitting the passage of a predetermined amount of seed, a knock-out member in the aforesaid chamber, and a pivoted gate at the rear of said knock-out chamber extending in the direction of motion of said seed plate by which seeds are prevented from entering said knock-out chamber, but which permits the passage of excess seed therethrough.

2. In a seed planter, a hopper, a seed plate revolubly supported in said hopper, said plate having a series of seed cells, a stationary member located above the plate having a knock-out chamber normally closed at both ends, and a knock-out member in the aforesaid chamber and a movable closure at the rear of said knock-out chamber extending in the direction of motion of said seed plate by which seeds are prevented from entering said knock-out chamber and normally held in contact with said seed plate by the weight of the seeds in the hopper contacting said movable closure.

3. In a seed planter, a hopper, a seed plate revolubly supported in said hopper, said plate having a series of seed cells, a stationary member located above the plate having a knock-out chamber normally closed at both ends, knock-out means in the aforesaid chamber, and gravity operated means at the rear of said knock-out chamber extending in the direction of motion of said seed plate by which seeds are prevented from entering said knock-out chamber, but which permits the passage therethrough of extraneous seeds trapped in said knock-out chamber 4. In a seed planter, a hopper, a seed plate revolubly supported in said hopper, said plate having a series of seed cells, a stationary member located above the plate having a knock-out chamber therein normally closed at both ends and a cut-off mounted thereon, a spring pressed knock-out in said chamber, and a movable closure at the rear of said knock-out chamber pivoting in the direction of motion of said seed plate by which excess seed passing said cut-off into the knock-out chamber may pass out again into the hopper.

5. In a seed planter, a hopper, a seed plate revolubly supported in said hopper, said plate having a series of seed cells, a stationary member located above the plate having a knock-out chamber therein normally closed at both ends, a knock-out member in the aforesaid chamber, cut-off means at the rear of said knock-out chamber pivoting in the direction of motion of said seed plate, and stop means limiting the vertical movement of said cut-off means.

6. In a seed planter, a hopper, a seed plate revolubly supported in said hopper, said plate having a series of seed cells, a stationary member located above the plate having a knock-out chamber therein normally closed at both ends, a knock-out member in the aforesaid chamber, means at the rear of said knock-out chamber pivoting in the direction of motion of said seed plate by which seeds are prevented from entering said knock-out chamber, said means pivoted to said stationary member and having means contacting said seed plate.

7. In a seed planter, a hopper, a seed plate revolubly supported in said hopper, a stationary member located above the plate having a knock-out chamber therein, a knock-down member in the aforesaid chamber, and a movable closure at the rear of said knock-out chamber pivoting in the direction of motion of said seed plate by which seeds are prevented from entering said knock-out chamber, said movable closure pivoted to said stationary member and having the end of said closure contacting the aforesaid seed plate parallel to the plane of the seed plate.

GEORGE M. KRIEGBAUM.